United States Patent [19]

Didier et al.

[11] Patent Number: 4,845,463

[45] Date of Patent: Jul. 4, 1989

[54] BRAKE SYSTEM WITH AUXILIARY PUMP WARNING CIRCUIT

[75] Inventors: Gregory S. Didier; James L. Roussey, both of Fort Wayne, Ind.

[73] Assignee: Navistar International Transportation Corp., Chicago, Ill.

[21] Appl. No.: 35,813

[22] Filed: Apr. 8, 1987

[51] Int. Cl.$^4$ .............................................. B60Q 1/00
[52] U.S. Cl. ................................... 340/453; 188/1.11
[58] Field of Search ............... 340/52 C, 638; 60/405; 307/116-118; 188/1.11; 417/278, 286, 288; 180/103 BF

[56] References Cited

U.S. PATENT DOCUMENTS

| | | | |
|---|---|---|---|
| 3,872,425 | 3/1975 | Kobayashi | 340/52 C |
| 3,995,711 | 12/1976 | Kittle | 60/405 |
| 4,025,781 | 5/1977 | Brearley | 340/52 C |
| 4,262,278 | 4/1981 | Howard et al. | 340/52 C |
| 4,290,045 | 9/1981 | Killinger | 340/52 C |
| 4,290,060 | 9/1981 | Eppley | 340/638 |
| 4,345,660 | 8/1982 | Miller | 340/52 R |

*Primary Examiner*—Joseph A. Orsino
*Assistant Examiner*—Jill D. Jackson
*Attorney, Agent, or Firm*—F. David AuBuchon; Dennis K. Sullivan

[57] ABSTRACT

A failure warning device is provided for use with an auxiliary pump unit made ready by either an ignition-on signal or a brake-on signal and activated by a pump-failure signal. The failure warning device has a monitor circuit coupled to a warning circuit. For maintaining reliability of the auxiliary pump unit, the module circuitry is wired as a monitor not including circuit components of the auxiliary pump unit. It has a first input coupled to a common ready signal produced by the pump unit and a second input coupled to a motor terminal of the pump unit. The monitor circuit responds to failure-related states of the ready signal and the motor terminal impedance and voltage by generating an anomaly signal. The alarm circuit switches on an alarm, such as a buzzer and light, when it receives both the ignition-on and anomaly signals. The monitor circuit can include a circuit for generating the anomaly signal when a comparator detects a difference between the brake-on signal and a simultaneously activated brake stop light signal. The monitor can also include a circuit to activate the alarm if a brake circuit detector senses a brake circuit failure.

10 Claims, 6 Drawing Sheets

FIG 2

PRIOR ART

BRAKE SYSTEM WITH AUXILIARY PUMP WARNING CIRCUIT

This invention relates to failure warning circuits for vehicle brake systems and more particularly to failure warning circuits for power brake systems on motor vehicles.

Today motor vehicles are commonly equipped with power brake systems. The driver's force on the brake pedal is converted into a fluid pressure that is boosted by a power brake booster and transmitted to the brakes to actuate them. To operate, the booster needs a supply of input fluid pressure from a main fluid pressure source, such as a main fluid pressure pump powered by the engine.

If the main fluid pressure source fails, there is no pressure for the booster. Then the brakes will not work, a very dangerous condition. For example, a main pump powered by the engine fails if (a) the engine stalls, (b) the drive linkage (typically a drive belt) from the motor breaks, or (c) the pump mechanism itself malfunctions.

Such power brake systems usually have a device for detecting failure of the main pressure source. Where the engine mechanically drives a main fluid pump, a flow detector is commonly provided in the fluid circuit from the main pump to the booster to detect pump failure. The flow detector can be an electrical flow switch which is opened by flow of the pump fluid but closes when the flow stops.

For safety, such brake systems also typically have an electrically powered auxiliary or booster pump that can be switched on as a back-up when the main pressure source powered by the engine fails. In one typical circuit, a normally open relay controls electrical power from the vehicle battery to the ungrounded input terminal of an auxiliary pump motor. To close the relay, the vehicle ignition must be on and an electrical flow switch must close because the main pump flow has stopped. Or alternatively, if the vehicle ignition is off, to close the relay the flow switch must close and the vehicle's brake pedal must be pressed (closing a normally open brake pedal switch). Thus, the auxiliary pump is only switched on in the infrequent cases where (a) the main pump fails with the ignition on, or (b) the driver applies the brakes with the ignition off.

Unfortunately, the auxiliary pump and its control circuitry can themselves develop various failures. In the example just given, the auxiliary pump will not work if (a) the flow switch jams in the open position, (b) the relay for switching on the auxiliary pump motor fails, (c) the electrical wiring or connections for the auxiliary pump have a break, or (d) the auxiliary pump motor windings have a discontinuity. Moreover, the failure of these parts is hard to detect since they are only infrequently used.

For this reason, warning circuits are commonly provided to automatically test for and signal certain failures of the auxiliary pump system. For example, U.S. Pat. No. 4,262,278 (Howard et al.) assigned to Bendix Corporation teaches a warning circuit (Howard's part 90) that lights warning lamps to check a vehicle brake system having both main and auxiliary brake fluid pumps. Unfortunately, the Bendix division of Allied Automotive manufactures the warning circuit of the Howard et al. patent as an electronic module on a printed circuit board (Part No. MP 414360 Rev or SR 414360) to be added to the electrical system of the auxiliary pump in such a manner that a failure or poor connection of the circuits of the module itself can cause malfunction of the auxiliary pump system. In the Bendix products, Howard's diode pair D1, D2 is in the module itself on the circuit board. A poor connection of the module, a diode failure in the module, or even simple removal of the module can prevent activation of the relay which turns on the auxiliary motor pump. Thus, adding warning circuit so constructed can increase the likelihood that the auxiliary pump will malfunction.

Therefore, an object of the present invention is to provide an improved warning circuit for the auxiliary pump electrical circuitry that is added to it without potential interference with the functioning of the auxiliary pump circuit, particularly should the circuit board or module having the warning circuit be poorly connected, be disconnected, or experience failure.

Motor vehicles almost always have a rear brake light switch activated by the brake pedal. Typically, pressing the pedal closes a normally open brake light switch to light the vehicle's rear brake lights. For safety reasons the electrical brake switch for activating the auxiliary pump motor when the ignition is off is usually a separate normally open electrical switch also closed by pressing the brake pedal. Thus, when the brake pedal is pressed, two separate switches are closed to respectively provide battery power to the rear brake lights and to turn on the auxiliary pump motor. Failure of either of these two switches could be very dangerous to the driver and others.

Since the brake lights cannot typically be seen by the driver when he is pressing the brake pedal, it would be desirable to have the proper functioning of the brake light switch frequently automatically checked when the ignition is on, the normal vehicle running condition. In the warning circuit of the Howard et al. patent, when the vehicle ignition switch is on, closing the brake switch normally has no further effect. It would also be convenient if instead the electrical brake switch for the auxiliary pump motor could be frequently checked during normal operation when the ignition is on.

Therefore, another object of this invention is to provide an improved warning circuit that frequently automatically checks the proper functioning of both the brake light switch and the electrical brake switch, giving a warning if either of them fails. More particularly, a further object is to provide a warning circuit that can check the proper functioning of the electrical brake switch even when the vehicle ignition is on and the main pump is functioning (flow switch open).

Today most pressurized fluid vehicle brake systems are dual circuit brake systems, the respective brake fluid lines of the dual brake circuits functioning separately from each other. Though they supply pressurized fluid to different wheel brakes, the dual brake circuits normally function alike. If one of the dual brake circuits fails, its pressure falls relative to the other. Therefore, a significant difference in pressure between the two brake circuits indicates failure of at least one of them. For safety, a differential pressure switch is usually provided between the dual brake circuits to detect such pressure differences.

For example, the differential pressure switch can be one that is normally open but closes when there is a significant difference in pressure between the two brake circuits. The closing of the differential pressure switch can be used to turn on a warning device, such as a lamp on the driver's instrument panel.

The previously mentioned Howard et al. patent provides such a differential pressure switch (Howard's part 86) which closes when there is a brake circuit failure. In Howard's warning circuit, when the differential pressure switch closes, it turns on a second or auxiliary warning light (Howard's part 76). The auxiliary light is in addition to a first warning light used to indicate failure of the main pump. In fact, Howard's circuit has a diode (Howard's part D7) specifically inserted to prevent his differential pressure switch (if closed) from causing the first warning light to turn on. In return for marginal advantages, Howard's auxiliary warning light clutters the instrument panel. Moreover, Howard's warning circuit operates even when the vehicle ignition is off. Since the driver is generally well aware that if the engine ignition is off the main pump, etc. cannot function normally, such warnings are redundant and even annoying.

Accordingly, another object of the invention is to provide a warning circuit that uses a first warning device to warn of main pump failure and to additionally respond to a differential pressure switch to warn of brake circuit failure. A further object is to provide failure warnings only when the vehicle ignition is on, yet still enable the auxiliary pump to be a safety back-up for the main pump regardless of whether the ignition is on or off.

In the conventional back-up arrangement, provision is made so that if the brakes are applied when the main pump has failed, the auxiliary electric pump operates regardless of whether the ignition is on or off. However, since the lead from the battery to the ignition switch generally has a protective fuse, an equally important question is, will the auxiliary pump operate if the fuse on the ignition lead is blown?

Therefore, it is an object of the invention to provide a fuse arrangement for the ignition and auxiliary pump circuits that enables the auxiliary pump to operate when the brake pedal is pressed regardless of whether a fuse in the lead between the battery and the ignition switch has failed.

SUMMARY OF THE INVENTION

In keeping with one aspect of the invention, a failure warning device is provided for use with an auxiliary pump unit made ready by either an ignition-on signal or a brake-on signal and activated by a pump-failure signal. The failure warning device has a monitor circuit coupled to a warning circuit. For maintaining reliability of the auxiliary pump unit, the monitor circuit is constructed as a module not including components of the auxiliary pump unit. It has a first input coupled to a common ready signal produced by the pump unit and a second input coupled to a motor terminal of the pump unit. The monitor circuit responds to failure-related states of the ready signal and the motor terminal impedance and voltage by generating an anomaly signal. The alarm circuit switches on an alarm, such as a buzzer and light, when it receives both the ignition-on and anomaly signals. The monitor can also include circuits for generating the anomaly signal if a brake switch for the auxiliary pump unit fails or if a brake circuit detector senses a brake failure.

BRIEF DESCRIPTION OF DRAWINGS

The above mentioned and other features of this invention and the manner of obtaining them will become more apparent, and the invention itself will be best understood, by reference to the following description of embodiments of the invention taken in conjunction with the accompanying drawings, in which.

DETAILED DESCRIPTION

Figure 1:
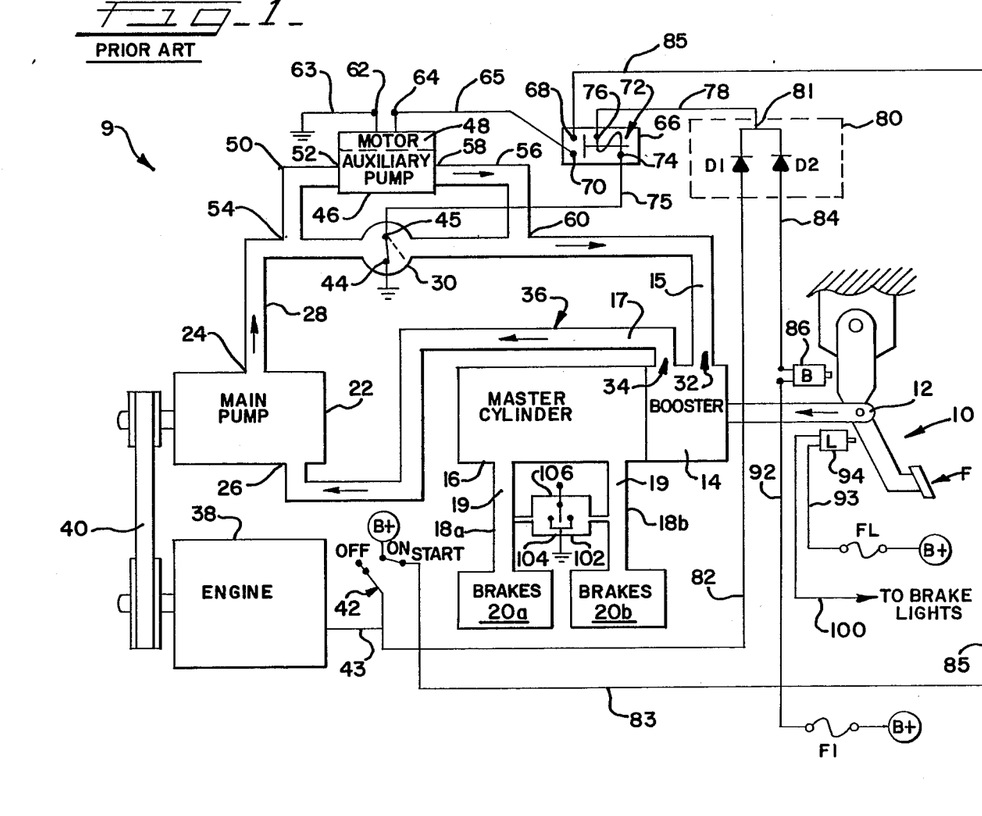
FIG. 1 is diagrammatic sketch of a prior art vehicular power brake system having an automatic auxiliary pump unit, shown with the vehicle engine off.

As shown in FIG. 1, a prior art power brake system 9 for a vehicle has a movable brake pedal 10 coupled to a brake rod 12 for transmitting the driver's pedal force F to a brake booster 14. Booster 14 amplifies pedal force F and applies it to a master brake cylinder 16. Master cylinder 16 provides pressurized brake fluid 19 via dual brake circuits 18a and 18b to sets of wheel brakes 20a and 20b.

Booster 14 is powered by an input of pressurized fluid 15 supplied from a main pump 22 via a pressurized fluid supply line 28. A flow detector switch 30 inserted in fluid supply line 28 is biased to close whenever fluid 15 stops flowing. As long as main pump 22 is functioning normally, the flow of pressurized fluid 15 in supply line 28 keeps flow detector switch 30 open. When main pump 22 fails, fluid 15 in supply line 28 stops, causing flow detector switch 30 to close. A return line 36 from booster 14 to main pump 26 allows for return of fluid 17 after a portion of its pressure is used by booster 14.

In diesel powered vehicles, the main pump 22 which provides for brake booster 14 is also the vehicle's steering pump, which provides pressurized fluid for a power steering system (not shown). The power brake system 9 is a secondary, downstream user of the pressurized fluid from the steering pump after the power steering system has had access to it.

Main pump 22 is powered by the vehicle's engine 38 via a drive coupling, which is typically a drive belt 40. The engine is controlled by an ignition switch 42 which has OFF, ON, and START positions which provides electricity to the engine electronics (not shown) via a lead 43. If main pump 22 fails, there is no pressure to activate booster 14 and power brake system 9 becomes totally inoperative. Typically, main pump 22 fails when engine 38 stalls, drive belt 40 breaks, or main pump 22 itself malfunctions. A failure of main pump 22 is automatically detected by flow detector switch 30, which closes to connect an output terminal 45 to a grounded terminal 44.

Power brake system 9 has an auxiliary pump 46 driven by an electric motor 48 powered by the vehicle's battery as a back-up for main pump 22. An auxiliary inlet line 50 connects an inlet port 52 of auxiliary pump 46 to fluid pressure line 28 at a junction 54, and an auxiliary outlet line 56 connects an outlet port 58 to line 28 at a junction 60.

Pump motor 48 is typically a DC motor having one terminal 62 grounded by a connection 63. The other terminal 64 is provided with a power supply voltage via a pump lead 65 connected to a controlled switch, such as a normally open relay 66. One relay contact 68 of relay 66 is coupled to the vehicle's battery voltage B+, and the other relay contact 70 is connected by pump lead 65 to the motor's power terminal 64.

Thus, pump motor 48 only operates when relay 66, which is normally open, is closed by its solenoid 72. One terminal 74 of solenoid 72 is connected to terminal 45 of flow detector switch 30 and is floating when fluid is flowing in line 28 but becomes grounded when the flow stops. A control lead 78 connects the solenoid coil's other terminal 76 to a common output 81 of an OR gate 80 formed by two power diodes D1 and D2.

Suppose lead 78 is provided with a positive battery voltage B+ by OR gate 80. If flow detector switch 30 then closes because main pump 22 has failed, a current flows through solenoid coil 72, lead 75, and closed flow detector switch 30 to ground. The activated solenoid 72 closes relay contacts 68 and 70, providing positive battery voltage B+ to power terminal 64 of grounded DC motor 48. This enables the motor to drive auxiliary pump 46. Thus, whenever lead 78 is provided with the battery voltage B+, the automatic auxiliary pump unit is ready to provide battery power to pump motor 48 if relay 66 is enabled by a ground signal at relay terminal 74. If main pump 22 fails, the closing of flow detector switch 30 provides the enabling ground signal to relay terminal 74 closing the normally open relay 66 to turn on pump motor 48.

However, if OR gate 80 cannot provide the battery voltage B+ to lead 78, the closing of flow detector switch 30 will not activate relay 66. That is, the automatic auxiliary pump unit will not be ready to provide back-up if the main pump fails. Thus, battery voltage B+ acts like a ready signal that must be available to lead 78 so auxiliary pump 46 can be operated whenever there is enabling ground signal from flow detector switch 30.

Two sources of battery voltage B+ (ready signals) protected by the vehicle's main fuse F1 are provided as inputs to OR gate 80 for output to lead 78. The first comes from the vehicle's ignition or key switch 42 when in the ON or START positions via an ignition lead 82 to the anode of diode D1. This positive anode voltage prepares diode D1 to conduct to provide battery voltage B+ at the OR gate output 81 and lead 78. Thus, if the ignition switch is in the ON or START positions the auxiliary pump system functions automatically. This covers the typical emergency where the engine is running but suddenly stalls or the drive belt to the main pump breaks, cutting off the main pump. Because the ignition switch is still in the ON position, the auxiliary pump turns on automatically when the flow in line 28 stops, causing flow detector switch 30 to close.

However, the driver sometimes also needs the auxiliary pump function for braking when the ignition is OFF. For example, a vehicle parked on a hill may start to roll before the ignition key is inserted. To provide for such an emergency, OR gate 80 has a second input lead 84 connected by a brake pedal switch 86 to the battery voltage B+. Brake pedal switch 86 is a normally open position sensitive switch positioned to close when the brake pedal 10 is applied. When the brake pedal is pressed, brake pedal switch 86 closes, providing battery voltage B+ to the anode of diode D2 of OR gate 80. Whenever flow detector switch 30 closes, diode D2 or OR gate 80 conducts the battery voltage B+ to OR gate output 81 and lead 78. This activates relay 66 to close, turning on the auxiliary pump motor 48. Thus, brake pedal switch 86 effectively provides a battery voltage B+ (ready signal) for the lead 78 even if the ignition switch is OFF.

The blocking action of diodes D1 and D2 prevents an undesirable circuit path between lead 82 to 84, but enables a battery voltage B+ (ready signal) on either lead 82 or 84, or both, to provide a battery voltage B (ready signal) at the junction 81 of the diodes' outputs. If the battery voltage B+ is considered a digital 1 or high signal and ground voltage a digital 0 or low signal, the combination of diodes D1 and D2 is seen to function as an OR gate.

FIG. 1 also shows two other safety mechanisms usually present in vehicles. A normally open brake light switch 94 is positioned to close when brake pedal 10 is pushed. The closing of brake light switch 94 connects the battery voltage B+, protected by a fuse FL, on lead 93 to a brake light lead 100 to turn on brake lights (not shown) at the rear of the vehicle each time the driver applies the brakes. A normally open differential pressure switch 102 is connected between dual brake lines 18a and 18b. If either brake line experiences failure, its pressure drops relative to the other. Such as difference in pressure causes switch 102 to close the connection between the grounded terminal 104 and an ungrounded terminal 106.

The prior art auxiliary pump unit of FIG. 1 provides safety by functioning automatically when the main pump fails. However, suppose the auxiliary pump unit itself experiences some failure, such as a broken connection, relay, or pump motor. There is no warning to he driver until a main pump failure occurs and the auxiliary pump unit fails to provide back-up braking function on demand from the driver attempting to stop the vehicle.

Figure 2:
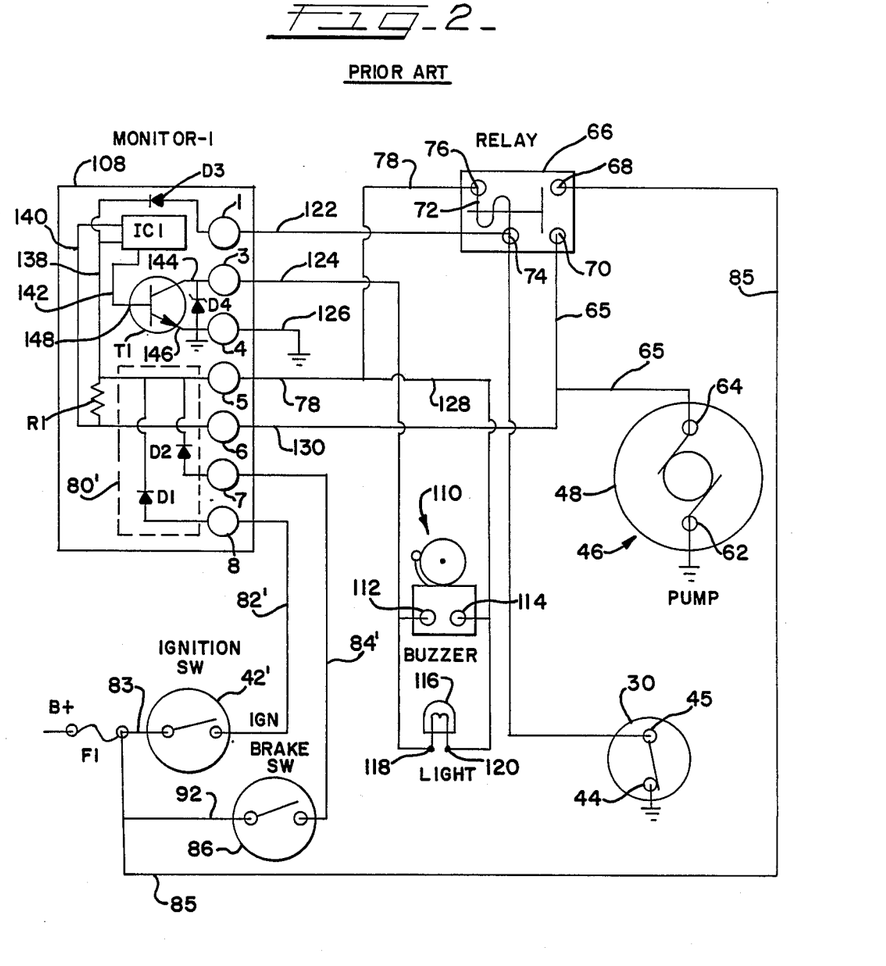
FIG. 2 is a circuit diagram of a prior art failure warning device used together with a vehicular automatic auxiliary pump unit, shown when the vehicle engine is off.

FIG. 2 shows a circuit diagram of a prior art failure warning device combined with the automatic auxiliary pump unit of FIG. 1. The circuit detects and warns of failure of certain elements of the automatic auxiliary pump unit. It is substantially that of the previously mentioned U.S. Pat. No. 4,262,278 (Howard et al.)

All the circuit elements of the automatic auxiliary pump unit of FIG. 1 are present in FIG. 2 with the same part numbers, except for a few necessary modifications which will now be discussed. FIG. 1 has an OR gate 80 formed of diodes D1 and D2. In FIG. 2 the analogous OR gate 80' is situated within a monitor module 108 (MONITOR-1).

For simplification the monitor module is shown plugged into its module socket (not visible). Connecting leads going outside the module from pins 1-8 are to be interpreted as leads from the corresponding pins of the module socket.

FIG. 1 provides lead 82 from ignition switch 42 to the anode of diode D1. In FIG. 2 the analogous connection is lead 82' from the ignition switch (not shown) to a pin 8, of a monitor module MONITOR-1, which pin is connected to the anode of diode D1. In FIG. 1, a lead 84 connects one terminal of brake switch 86 to the anode of diode D2. In FIG. 2, the analogous connection is lead 84' from brake switch 86 to a pin 7 of MONITOR-1, which pin is connected to the anode of diode D2. In FIG. 1, the cathodes of diodes D1 and D2 are joined at 81 and connected by lead 78 to relay terminal 76. In FIG. 2, the analogous connection is first from the cathodes of diodes D1 and D2 to pin 5 of MONITOR-1, and then from pin 5 by a lead 78, to relay terminal 76.

The automatic auxiliary pump unit of FIG. 2 generally functions identically to that shown in FIG. 1. However, several potential new failure modes are introduced because OR gate 80' is on monitor module MONITOR-1. First, if the failure warning circuit's module is, removed for repair or otherwise not present, the automatic auxiliary pump unit is disabled because the power ready signals on leads 82' and 84' cannot reach terminal 76 of relay 66. In other words, the critical circuit path for the automatic auxiliary pump unit goes through the monitor module.

Second, diodes D1 and D2 must be relatively high current diodes to control battery current to relay solenoid coil 72. These diodes are referred to hereafter as high current diodes in that the current passing through them is high relative to the current passing through the logic circuits of the monitor module MONITOR-1. When these diodes operate, high currents are input to pin connections 7 and 8 and output to pin 5. Such pin connections are potential sources of circuit failures for high currents, particularly if the monitor module is not especially designed for high currents.

Finally, the automatic pump unit's power switching high current diodes D1, D2 require more heat dissipation than the failure warning circuit's low current logic circuits. It is difficult to put the high and low current circuits in the same module without compromising either heat dissipation for diodes D1, D2 or low cost packaging for the logic circuits. For example, the Bendix division of Allied Automotive makes such a compromise monitor module (part no. MP414360 REV or SR 414360) using printed circuit board construction and connectors more suitable for low current circuits.

The remaining circuit elements not found in FIG. 1 are for the failure warning device. Module MONITOR-1 has connection pins 1-8. Pin 1 of the module socket is connected by a lead 122 to solenoid terminal 74. On the module, pin 1 is connected to the anode of a diode D3 whose cathode connects to pin 5. Pin 5 of the socket is connected by lead 78' to relay terminal 76, putting diode D3 in parallel with solenoid coil 72. Since relay 66 is activated by providing a positive voltage to terminal 76 relative to terminal 74, diode D3 does not affect activation of the relay. But when the relay is suddenly deactivated, diode D3 provides a return path to terminal 76 for transient solenoid coil current, suppressing noise.

Pin 3 of the module socket is connected by a lead 124 to one input of a warning buzzer 110 at a buzzer terminal 112, and to one input of a warning light 116 at a light terminal 118. Within the module, pin 3 is connected to a collector 144 of a switching transistor T1.

Pin 4 of the module socket is connected by a lead 126 to the common ground of the auxiliary pump unit. Within the module is a local ground, which is tied via pin 4 and lead 126 to the common ground.

Within the module, pin 4 is also connected to an emitter 146 of switching transistor T1. If a base 148 of switching transistor T1 is at a low signal voltage, switching transistor T1 is off and the coupling between the transistor's collector 144 and emitter 146 is OPEN (high impedance). When base 148 is raised to a high signal voltage, switching transistor T1 turns on and the coupling between the transistor's collector and emitter is CLOSED (low impedance). Since emitter 146 is grounded, this effectively grounds pin 3 of the module. A zener diode D4 is connected between the collector 144 and emitter 146 of switching transistor T1 as an overvoltage protector.

Pin 5 has already been described as connected within the module to the output of OR gate 80'. If the vehicle ignition is at ON or START or the brake pedal is pressed, pin 5 is at the battery voltage B+, which it supplies via a lead 138 to activate an integrated circuit IC1. p Pin 5 of the module socket is connected by leads 78' and 128 to the other buzzer terminal 114 and the other light terminal 120. Pin 5 can supply the battery voltage B+ whenever the vehicle ignition is at ON or START or the brake pedal is pressed. If voltage B+ is present at terminals 114 and 120, the buzzer and light go on whenever switching transistor T1 is switched CLOSED by a high signal voltage applied to its base 148. Otherwise, the buzzer and light are off.

Pin 6 of the module socket is connected by a lead 130 to the relay contact 70. Relay contact 70 is generally in one of three states VOLTAGE B+—If relay 66 is closed, there is battery voltage B+ at relay contact 70. If lead 65 is sound, motor power terminal 64 and lead 130 will also be at the battery voltage B+.

GROUND—If relay 66 is open and lead 65 and the motor winding (not shown) are sound, relay contact 70 will be grounded by the electrical path through the windings to the motor's grounded terminal 62, as will lead 130.

HIGH IMPENDENCE—When relay 66 is open, if lead 65 is broken or the motor winding has a discontinuity (broken motor), relay contact 70 will have a high impedance to ground (be floating).

Within the module, pin 6 is connected to pin 5 by a pull-up resistor R1 whose resistance is high (e.g., 2 kohm) relative t the conductive path through the motor winding. If relay contact 70 is in either the VOLTAGE B+ or GROUND states, the 2 kohm load of resistor R1 has no noticeable effect on the voltage at pin 6. But if relay contact 70 is in the HIGH IMPEDANCE state, the effect of the 2 kohm resistor R1 is to "pull-up" pin 6 to the voltage of pin 5. As a practical matter, this is only important when pin 5 is at the battery voltage B+ (IC1 activated). Therefore, a broken motor winding or broken lead 65 results in pin 6 having the voltage B+ at a time when it should be at ground voltage.

Figure 3:
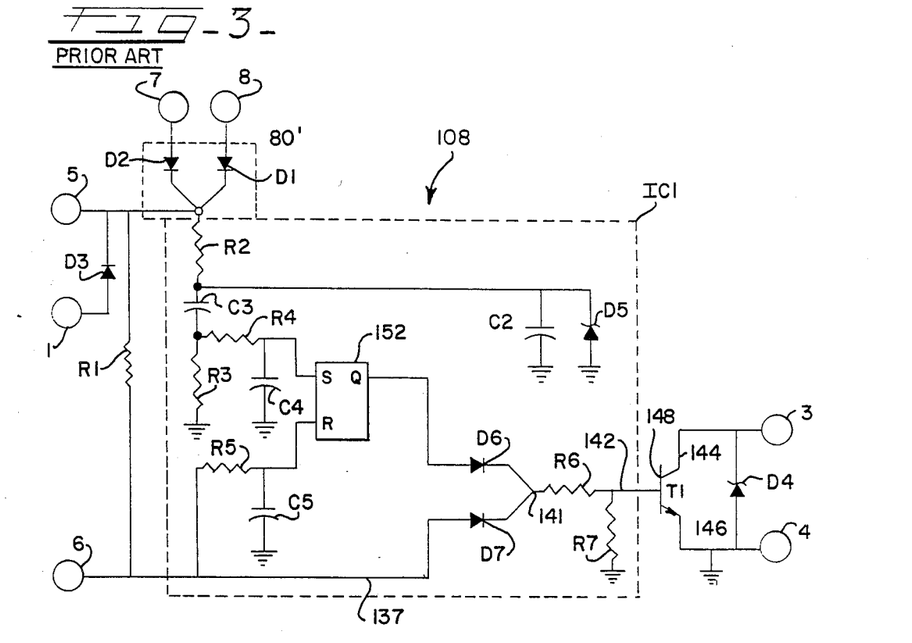
FIG. 3 is a prior art circuit diagram of a monitor module shown in the warning device of FIG. 2.

FIG. 3, shows the prior art circuit of module MONITOR-1 in more detail. Battery voltage B+ to activate IC1 is input at pins 7 and 8 via diodes D2 and D1 of OR gate 80'. The circuit is only active when the ignition is on or the driver presses the brake pedal. The battery voltage B+ from OR gate 80' is output at pin 5 to relay terminal 76 and one side of the warning buzzer and light (FIG. 2).

Pin 6 is connected by a diode D7, input resistor R6, and lead 142 to the base 148 of switching transistor T1. A resistor R7 biases base 148 to ground. If the signal on pin 6 from the motor's power terminal 64 is battery voltage B+, diode D7 conducts and the voltage on lead 142 at the junction of resistors R6 and R7 increases to cause switching transistor T1 to CLOSE, turning on the warning buzzer and the light. This happens ever time the auxiliary pump motor is maintained on by relay 66. It also happens if the winding of motor 48 suffers a discontinuity, since pull-up resistor R1 then raises pin 6 to the battery voltage B+.

The monitor module has a set-reset flip-flop 152 having a set input S, a reset input R, and a reference output Q reflecting the logical state (1 or 0) of the flip-flop. When the flip-flop is set, Q is a high signal voltage (logical 1). Resetting the flip-flop makes Q a low signal voltage (logical 0). Typical values for the resistors and capacitors connected to the S and R inputs are:

| | | | |
|---|---|---|---|
| R1 = | 2 kohms | | |
| R2 = | 0.68 kohms | C2 = | 10 MFD |
| R3 = | 100 kohms | C3 = | 0.1 MFD |
| R4 = | 10 kohm | C4 = | 0.01 MFD |
| R5 = | 100 kohm | C5 = | 0.1 MFD |
| R6 = | 1 kohm | | |
| R7 = | 10 kohm | | |

Output Q is connected by a diode D6 to input resistor R6. Just as a high signal voltage input to diode D7 causes switching transistor T1 to CLOSE, if Q is a high signal voltage, it causes switching transistor T1 to CLOSE.

When the vehicle ignition is first turned ON, the module receives operating battery voltage B+ via lead 82' (FIG. 2), pin 8, and diode D1. The RC inputs to flip-flop 152 are arranged so that it initializes in the 1 state (Q=1). Because relay 66 is not yet activated, the windings of motor 48 keep motor power terminal 64, lead 130, and pin 6 at ground. In addition, capacitor C5 is initially uncharged, so that its terminal connected to the reset input R can only acquire a voltage different from ground at a speed related to the time constant R5C5=10 ms. Therefore, reset input R is low (logical 0).

Initially uncharged capacitor C3 and relatively low impedance resistor R2 apply nearly all the battery voltage B+ input at D8 to the junction of resistors R3 and R4. Because R4C4=0.1 ms, this voltage is almost immediately delivered to the set input S, setting Q=1, to CLOSE transistor. This turns on the warning buzzer and light.

As capacitor C3 charges up at a speed related to R3C3=10 ms, the voltage input to S soon decays to zero. Engine driven main pump 22 (FIG. 1) requires a short start up interval to establish pressure, during which time flow detector switch 30 remains closed. The battery voltage B+ input at pin 8 is delivered via pin 5 and lead 78' (FIG. 2) to terminal 76, closing relay 66 to start pump motor 48.

The closing of relay 66 delivers battery voltage B+ to lead 65, motor power terminal 64, lead 130, and pin 6. After a brief delay related to time constant R5C5=10 ms, input resistor R5 delivers the battery voltage B+ to reset input R, resetting Q=0. A capacitor C2 and voltage regulating zener diode D5 are connected between ground and the junction of R2 and C3 to eliminate noise that might result in a subsequent false setting of the flip-flop.

Resetting the flip-flop does not turn off the buzzer and alarm because the battery voltage B+ now on pin 6 is applied to input resistor R6 via diode D7. Eventually main pump 22 establishes pressure flow, opening flow detector switch 30 to deactivate relay 66. Pin voltage returns to zero, and since both diodes D6 and D7 have a zero input, switching transistor T1 OPENS, turning off the buzzer and light.

Thus, when the ignition is turned on, the warning buzzer and light go on. Afterwards they only go off if the automatic auxiliary pump system first turns itself on then off.

If the ignition is OFF and the brake pedal pressed, the battery voltage B+ is instead delivered to pin 7, but the module still initializes to the 1 state (Q=1) as previously described, turning on the alarm. With ignition off, flow detector switch 30 is closed, activating relay 66 to turn on the auxiliary pump motor 48 and resetting flip-flop 152. But because the main pump cannot function to restore flow, the alarm stays on until the pedal is released.

Many drivers find it annoying that the circuit of FIG. 3 makes an alarm just because the brakes are used with the ignition OFF. The find the alarm redundant and distracting because they are already aware that the engine is off and cannot power the brakes, etc.

Figure 4:
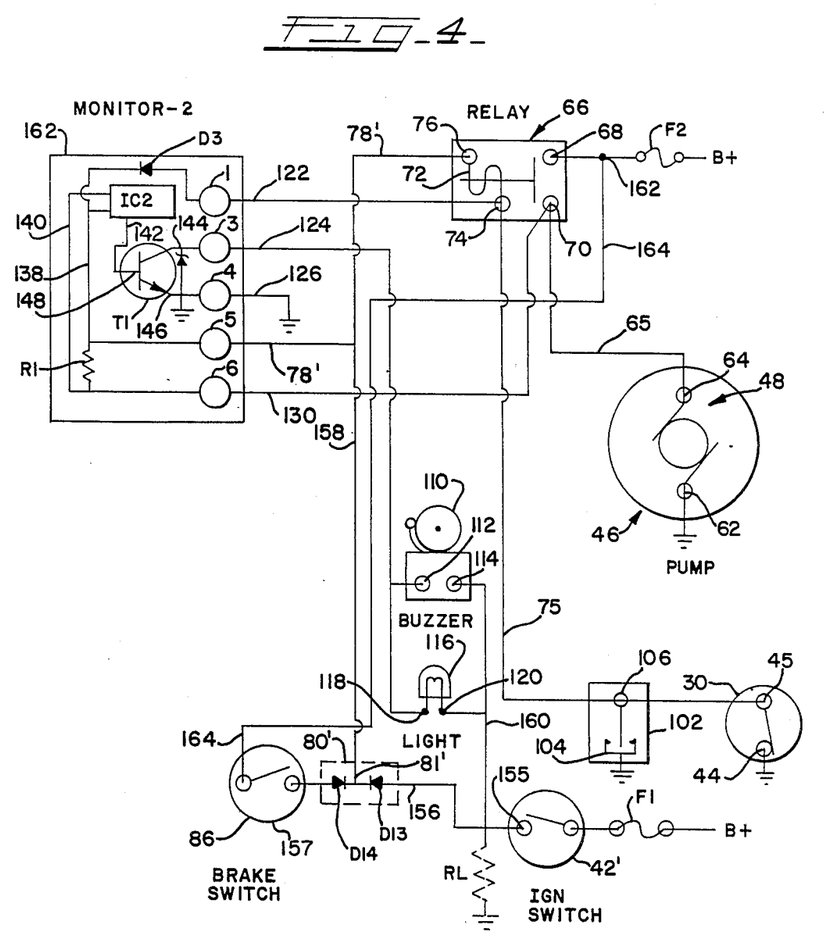
FIG. 4 is a circuit diagram of a first embodiment of an inventive failure warning device used together with a vehicular automatic auxiliary pump unit, shown when the vehicle engine is off.

FIG. 4 shows a first embodiment of an improved failure warning device used together with an automatic auxiliary pump. Vehicle battery voltage B+ is provided to one terminal of an ignition switch 42' via a vehicle main feed fuse or circuit breaker F1. Dotted resistor RL, connected between the other terminal 155 and ground, generally represents the other electrical circuits of the vehicle that are turned on when the ignition switch 42' is closed (motors, lights, etc.). Main feed fuse F1 is usually present in vehicles to protect against shorts in any of the loads represented by resistor RL.

A lead 156 connects terminal 155 of switch 42, to the anode of D13. The cathode of diode D13 connects to node 81', which is connected to relay terminal 76 by leads 158 and 78'. Lead 78' connects relay terminal 76 to pin 5 of the socket of a monitor module 161 (MONITOR-2). A lead 160 connects ignition switch terminal 155 to buzzer terminal 114 and light terminal 120. Lead 124 connects buzzer terminal 112 and light terminal 118 to pin 3 of the module socket. Adjacent pin 4 of the module socket is grounded.

Lead 75 connects relay terminal 74 to normally open differential pressure switch 102 at terminal 106 and flow detector switch 30 at terminal 45. Terminal 44 of flow detector switch 30 and terminal 104 of differential pressure switch 102 are grounded. Lead 122 connects relay terminal 74 to pin 1 of the module socket.

A fusible link F2 provides vehicle battery voltage B+ to relay contact 68. Lead 65 connects relay contact 70 to motor power terminal 64. Lead 130 connects relay contact 70 to pin 6 of the module socket. The motor's other terminal 62 is grounded. A lead 164 connects fusible link F2 to one terminal of brake switch 86. The other terminal of brake switch 86 is connected to the anode of diode D14. The cathode of diode D14 is connected to the cathode of diode D13 at node 81'.

Since high current diodes D13 and D14 are separate from the logic circuits of MONITOR-2, they can be more reliably connected to each other and leads 156, 157, and 158 and better provision made for heat dissipation. For example, they can be incorporated in the cable leads of the wiring harness for the automatic auxiliary pump unit using conventional techniques. If easy replacement is desired, each diode can easily be incorporated into a conventional pluggable unit designed for high current and power dissipation.

Figure 5:
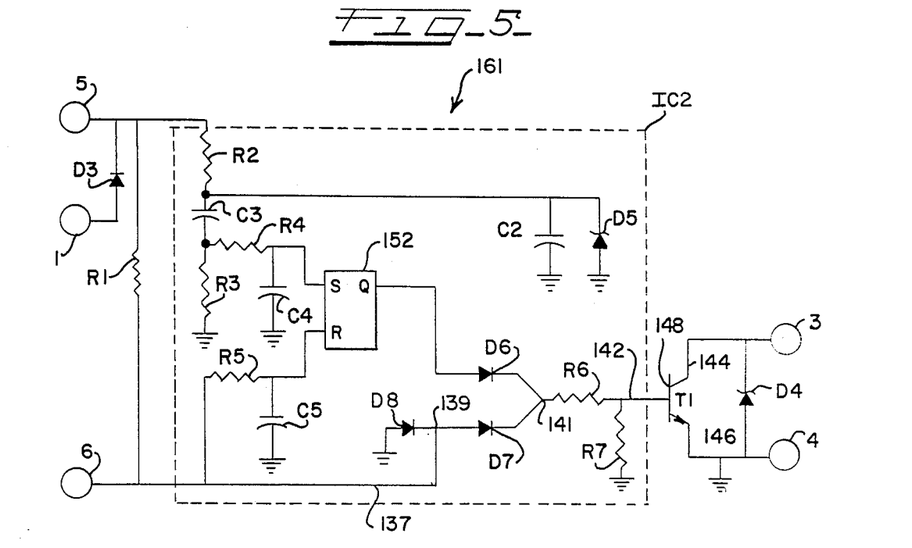
FIG. 5 is a circuit diagram of a monitor module shown in the inventive warning device of FIG. 4.

Monitor module MONITOR-2 has an improved integrated circuit IC2. FIG. 5 shows the circuit diagram of module MONITOR-2, including the details of integrated circuit IC2. Circuit IC2 generally uses the same configuration as IC1 (FIG. 3), and we have used the same numbering for the same structures. A noise reducing diode D8 has a grounded anode, and the cathode is connected at node 139 to the anode of diode D7 and lead 137. This connection of diode D8 improves the operation of MONITOR-2, which is made more reliable by suppressing negative noise transients arriving from pin 6 on lead 137.

In operation the failure warning device of FIG. 4 has many improvements over the prior art device of FIG. 2. First, none of the elements or connections required for operation of the automatic auxiliary pump unit are in or routed through the MONITOR-2:

If ignition switch 42' is closed (ON) and flow switch 30 closes (flow stops), the circuit from battery B+ via fuse F1, ignition switch 42', diode D13, lead 158, solenoid coil 72, and flow switch 30 to ground is completed, activating relay 66. Relay 66 closes contacts 68, 70, completing the circuit from battery B+ via closed relay contacts 68, 70, lead 65 to motor terminal 64 of pump motor 48.

For an open ignition switch, if brake pedal 10 is pressed when the flow detector switch 30 is closed, the circuit from battery B+ via fusible link F2, lead 164, closed brake switch 86, diode D14, lead 158, solenoid coil 72, and flow switch 30 to ground is completed, activating relay 66 to turn on pump motor 48.

MONITOR-2 is only used for failure warning, as can be seen from a summary of its pin connections. Pin 1 (in cooperation with pin 5) connects noise suppression diode D3 across solenoid coil 72. Such noise suppression is not needed by the automatic auxiliary pump unit, but it improves the warning circuit. Pin 3 is the output by which the module's switching transistor T1 can ground one side of the buzzer and light via lead 124. (The other side of the buzzer and light receive battery B+ via lead 160 if ignition switch 42' is closed.) Pin 4 is merely to tie the module's ground to the auxiliary pump unit's ground. Pin 5 taps into lead 158 for operating voltage B+ if it is present. Pin 6 is directly connected by lead 130 to relay contact 70 to monitor it for an anomalous voltage or impedance as previously described.

Thus, even if the module MONITOR-2 fails, is omitted or removed, the automatic auxiliary pump unit will provide back-up braking. By comparison, in the circuit of FIG. 2, removal of module MONITOR-1 causes failure of the automatic auxiliary pump unit.

Moreover, by our connecting buzzer terminal 114 and light terminal 120 to terminal 155 of ignition switch, the warning alarm is suppressed if the ignition switch is OFF. By comparison, in the circuit of FIG. 2, even if the ignition is OFF, pressing the brake pedal causes an alarm, as previously explained, which many drivers find annoying.

A further improvement is that a separate fusible link F2 has been provided for the pedal-operated circuit of the automatic auxiliary pump unit. The vehicle's main feed fuse F1 may be blown by a short in some component (represented by RL) attached to the ignition switch. In the prior art circuits of FIGS. 1 and 2, if fuse F1 is blown, the automatic auxiliary pump unit becomes totally inoperative. The battery voltage is not available for ignition switch 42', brake switch 86, and relay contact 68. But in our improved circuit of FIG. 4, brake switch 86 is connected to a separate fusible link F2 by lead 164, and relay contact 68 is also connected to fusible link F2. Thus, even if main fuse F1 blows, when the driver steps on the brake pedal the automatic auxiliary pump will operate.

Yet another improvement incorporated in the warning circuit of FIG. 4 is that by connecting differential pressure switch 102 in parallel with flow detector switch 30, the buzzer and light will go on if differential switch 102 detects a brake circuit failure (closes). That is, a failure of one of the brake circuits will activate the auxiliary pump motor 48. This is a unique use of pressure differential switch 102.

In the prior art of FIG. 1, the auxiliary pump unit only provides back-up pressure to the booster fluid circuit. The failed brake circuit 20a or 20b is a separate hydraulic circuit, powered by master cylinder 16, that cannot be assisted by the auxiliary pump unit.

In our circuit, if the ignition is ON, turning on auxiliary pump motor 48 causes buzzer 110 and light 116 to go on. This is because whenever auxiliary motor 48 is turned on, the voltage at monitor module pin 6 becomes the battery voltage B+. As shown in FIG. 5, whenever pin 6 is the battery voltage B+, diode D7 and input resistor R6 provide current to the base of switching transistor T1, causing it to CLOSE pins 3 and 4 to switch on the warning alarm.

This unique approach allows the buzzer and light to be dual purpose, simplifying the instrument panel and manufacturing cost. Their warning can either indicate that the main pump has failed or that a brake circuit has failed. The warning is all that is necessary for alerting the driver that the brakes are dangerously unreliable and need immediate attention.

Figure 6:
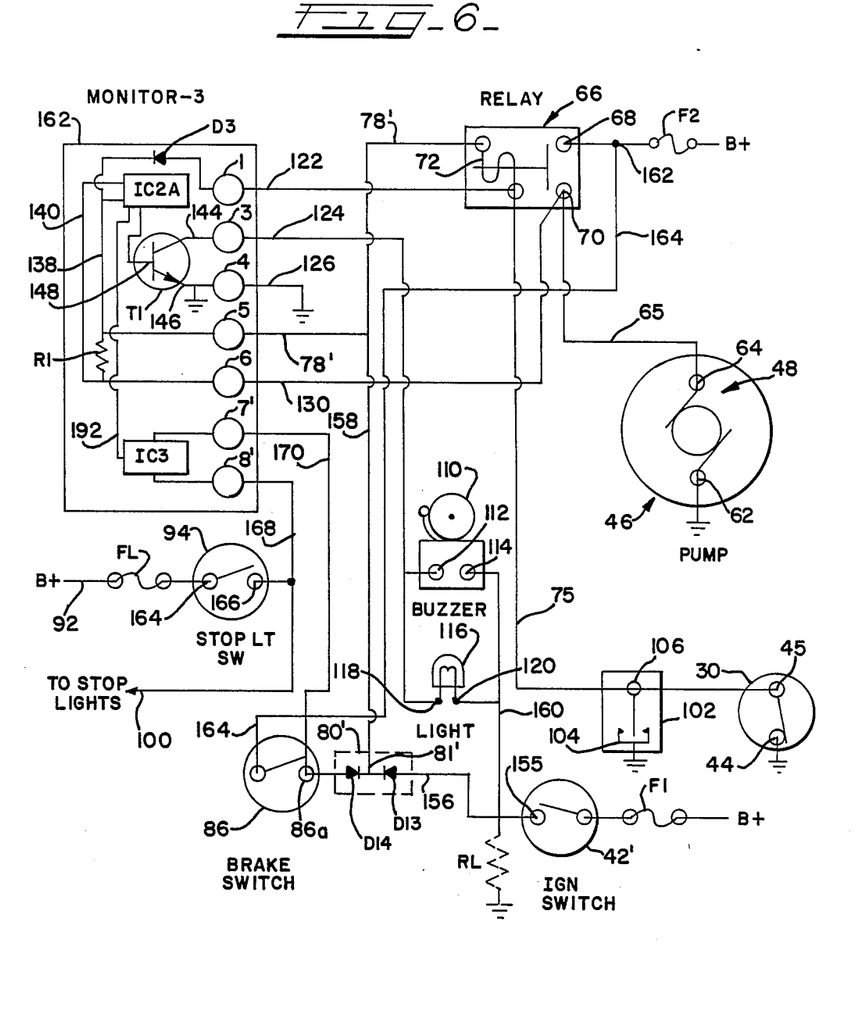
FIG. 6 is a circuit diagram of a second embodiment of an inventive failure warning device used together with a vehicular automatic auxiliary pump unit, shown when the vehicle engine is off.

FIG. 6 shows a circuit diagram of a second embdiment of the improved failure warning device used together with an automatic auxiliary pump unit. This circuit is similar to the one of FIG. 4, except that it performs a further safety check and warning of brake pedal switch 86 and stop light switch 94 (see FIG. 1).

In FIG. 6 an improved monitor module MONITOR-3 is provided which is similar to MONITOR-2 of FIG. 4 but has expanded integrated circuit IC2A in place of IC2, an additional integrated circuit IC3, and pins 7' and 8'. Brake light switch 94 is provided at terminal 164 with voltage B+ via a fuse FL. The other terminal 166 is connected by lead 168 to pin 8, of the module socket. Within the module, pin 8' connects to a first input of circuit IC3. A lead 100 connects terminal 166 to the vehicle's rear stop lights.

A lead 170' connects terminal 86a of brake switch 86 to pin 7' of the module socket. Within the module, pin 7' connects to a second input of circuit IC3. Circuit IC3 has an output connected by a lead 192 to a corresponding input of expanded circuit IC2A.

Figure 7:
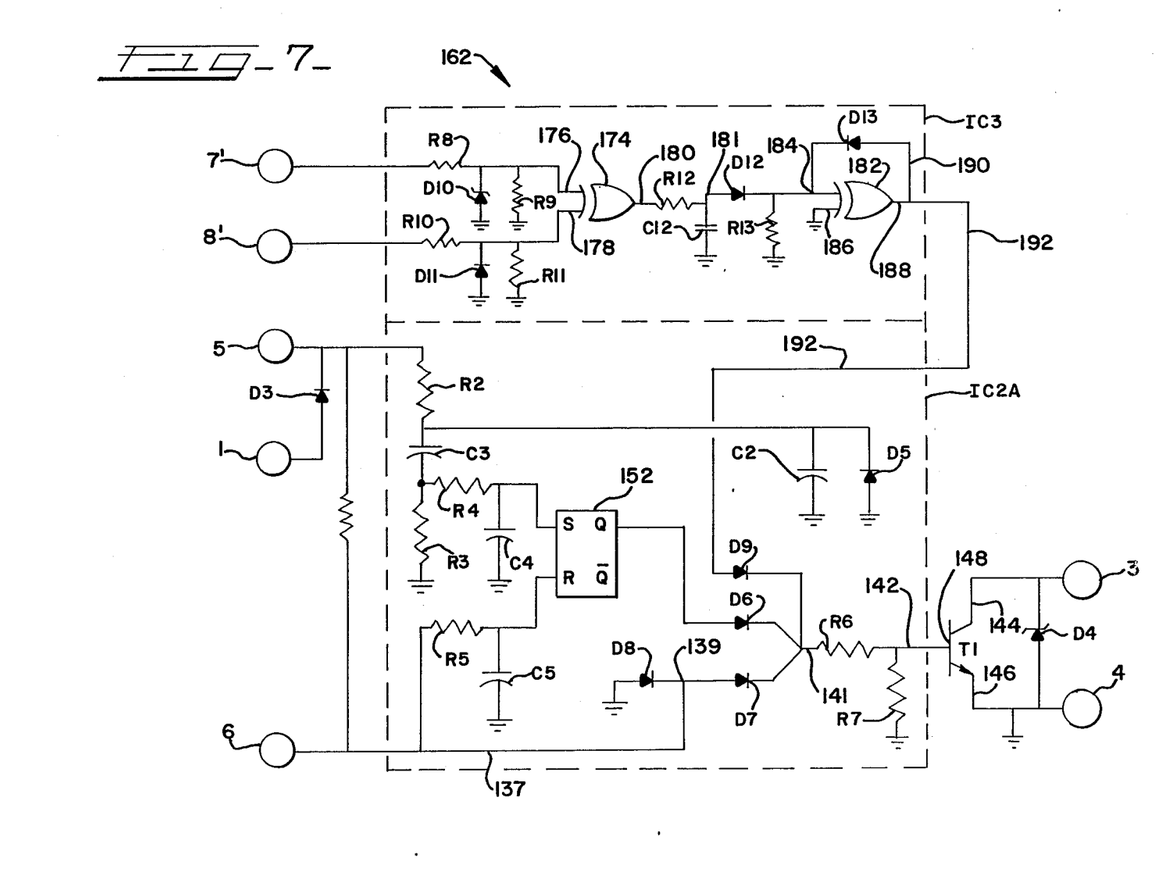
FIG. 7 is a circuit diagram of a monitor module shown in the inventive warning device of FIG. 6.

FIG. 7 shows a circuit diagram of monitor module MONITOR-3. The expanded integrated circuit IC2A is similar to IC2 of FIG. 5, but an additional input diode D9 has been added to node 141. If the input at the anode of diode D9 is a high signal voltage (logical 1), diode D9 and input resistor R6 provide current to the base of switching transistor T1, causing it to CLOSE pins 3 and 4 to switch on the warning alarm.

Integrated circuit IC3 is a comparator that compares the voltage signals input on pins 7' and 8'. Its output on line 192 is a high signal voltage (logical 1) if the inputs are different and a low signal voltage (logical 0) otherwise. If the output is a high signal, it is latched.

Pin 7' is coupled by an input resistor R8 to a first input 176 of an XOR (exclusive OR) gate 174. A resistor R9 and an overvoltage protector zener diode D10 are connected between input 176 and ground. Similarly, pin 8' is coupled by a resistor R10 to the gate's second input 178, and a resistor R11 and a zener diode D11 are connected between input 178 and ground. The gate output 180, which will only be a high signal voltage if pins 7' and 8' are at different voltages, is coupled by a resistor R12 to a terminal 181 of a capacitor C12 whose other terminal is grounded. R12 and C12 act on the signal at 180 as an RC low pass filter or delay circuit whose output 181 has the time constant TC=R12C12.

As shown in FIG. 6, the signals from pins 7' and 8' being compared by XOR gate are the respective voltages on brake switch terminal 86a and stop light switch 166. As brake pedal 10 should actuate both switches identically, normally pins 7' and 8' should always have the same voltage, except for brief intervals due to switch bounce, etc. R12 and C12 are selected so time constant TC will be long enough to smooth out any spurious transient difference due to switch bounce or the like. For example, TC=about 250-500 ms works well.

A second XOR gate 182 latches if it receives a logical 1. The smoothed signal 181 is coupled to an input 184 of XOR gate 182. A bias resistor R13 is connected between input 184 and ground. The other input 186 of gate 182 is maintained as a logical 0 by being grounded. Whenever the signal 181 rises to reach the threshold for a logical 1, the gate output 188 will become a high signal voltage (logical 1). A feedback lead 190 having a blocking diode D13 couples the output 188 back to input 184, forming a positive feedback loop. Thereafter, if signal 181 falls below the threshold for a logical 1, diode D12 will become an open circuit, leaving gate 182 latched in the 1 state by feedback lead 190. (The latch can be reset by turning off the B+ voltage to the monitor module, for example by shutting off the vehicle ignition.)

A lead 192 connects output 188 to the anode D9 in IC2A. If the signal on lead 192 is a logical 1, it can cause switching transistor T1 to CLOSE pins 3 and 4 to switch on the warning buzzer and light, and this condition will be latched by gate 182. If the signal on lead 192 is a logical 0, the state of transistor T1 is left to depend o the inputs to the anodes of diodes D6 and D7.

Thus, the failure warning device of FIGS. 6 and 7 has the added advantage that when the ignition is ON, if either stop light switch 94 or brake switch 86 fails, normal use of the brake pedal will set off a warning alarm. The detectable failures would include wiring breaks, switch breaks, a blown fuse FL, and a melted fusible link F2. Of course, if desired the output of integrated circuit IC3 can instead be used to drive a separate switching transistor (not shown) that can switch on a separate buzzer or light alarm (not shown).

The same buzzer and light are thus enabled to signal failure of many different safety mechanisms: main pump failure, brake circuit failure, auxiliary pump unit failure, auxiliary pump brake switch failure, and stop light switch failure. The vehicle instrument panel is simplified and its cost reduced, yet the driver is promptly warned when the brakes or their stop lights need immediate attention.

While the principles of the invention have been described above in connection with specific apparatus and applications, it is to be understood that this description is made only by way of example and not as a limitation on the scope of the invention.

The invention claimed is:

1. A failure warning device for monitoring an automatic safety pump unit without degrading the pump unit's reliability, the pump unit having an automatic power supply and an auxiliary pump with a pump power terminal, the automatic power supply including:

ready gate means having first and second gate inputs and a common gate output, for respectively receiving first and second power ready signals at the first and second gate inputs and transmitting them to the common gate output as a common ready signal; and voltage supply means, having an output terminal, coupled to the common gate output to receive the common ready signal and having an enable input for receiving a pump failure signal, for supplying working voltage to the pump power terminal when both the common ready signal and failure signal are received; said warning device comprising:

monitor module means, the module means not including any components needed to operate the safety pump unit, the module means having first and second monitor inputs and a monitor output, the first and second inputs being respectively coupled to the common gate output and the voltage supply means output terminal, the common gate output and the voltage supply means output terminal being external to the module means, the module means generating an anomaly signal at the monitor output for fault-indicating states of said common ready signal and said voltage supply means output terminal; and alarm means coupled to the first gate input and the monitor output, the alarm means generating an alarm only when both the first power ready signal and anomaly signal are received.

2. The failure warning device of claim 1 wherein the monitor is constructed as a plug-in module.

3. The failure warning device of claim 1 wherein: the voltage supply means includes a pump lead for supplying voltage to the pump power terminal, and the module means generates an anomaly signal at the monitor output for fault-indicating states of said common ready signal, the pump lead, and the pump power terminal.

4. The failure warning device of claim 1 adapted for use with an automatic power supply that receives an ignition-on signal as the first power ready signal and receives a brake-on signal as the second power ready, the alarm means being for generating an alarm only when both the ignition-on signal and the anomaly signal are received.

5. The failure warning device of claim 1 for use with a vehicle power brake system having a plurality of hydraulic brake circuits and further including a hydraulic brake circuit failure detecting means for providing a signal identical to the pump failure signal to the enable input of the voltage supply means when one of the brake circuit fails.

6. The failure warning device of claim 1 adapted for use with a vehicle braking system having a light switch for switching on and off a lamp signal to a vehicle stop light and a brake switch for switching on and off a ready signal to an auxiliary brake pump unit, the stop light switch and brake switch being adapted for substantially simultaneous activation to both switch on and off together, said warning circuit further comprising:

comparator means coupled to the light switch and the brake switch for comparing the lamp and ready signals and generating a digitalized difference signal if one is off while the other is on;

low pass filter means responsive to the digitalized difference signal for smoothing it to produce an error signal; and, means responsive to the error signal for generating said alarm.

7. An automatic auxiliary pump system comprising:

auxiliary pump means having a pump power terminal;

ready gate means having a first and second gate inputs and a common gate output, for respectively receiving first and second power ready signals at the first and second gate inputs and transmitting them to the common gate output as a common ready signal, and voltage supply means, coupled to the common gate output to receive the common ready signal and having an enable input for receiving a pump failure signal, for supplying working voltage to the pump power terminal when both the common ready and failure signals are received;

monitor module means, the module not including any components needed to operate the ready gate means, the module having first and second monitor inputs and a monitor output, the first and second inputs being respectively coupled to the common gate output and the voltage supply means output terminal, the common gate output and the output terminal being external to the module, the module means generating an anomaly signal at the monitor output for fault-indicating states of said common ready signal and said voltage supply means output terminal; and alarm means coupled to the first gate input and the monitor output, and the alarm means generating an alarm only when both the first power ready signal and the anomaly signal are received.

8. An automatic auxiliary pump unit for use with a vehicle having a power brake system, powered by a main fluid pump, having brake circuits and actuated by a brake pedal, said auxiliary pump unit comprising:

an electric pump means for backing up the main pump;

first failure detector means for generating a fluid flow failure signal when the main pump fails;

second failure detector means for generating a brake circuit failure signal when a brake circuit fails;

voltage supply means, responsive to either the fluid flow failure signal or the brake circuit failure signal, or both, for activating the electric pump means; and alarm means, responsive the electric pump means being activated, for providing an alarm.

9. An automatic auxiliary pump unit for use with a vehicle having a battery coupled by a main fuse or circuit breaker to an ignition switch for ON/OFF control of the vehicle's electrical power, and a power brake system powered by a main fluid pump and actuated by a brake pedal, said auxiliary pump unit comprising:

an electric pump means adapted as a back-up for the main pump;

failure detector means for generating a failure signal when the main pump fails;

ignition detector means for generating a ignition-on signal when the ignition switch is ON;

pedal detector means for generating a brake-on signal when the brake pedal is actuated;

ready gate means responsive to either the ignition-on signal from the ignition detector or the brake-on signal from the pedal detector, or both, for providing a ready signal;

voltage supply means, responsive to the ready signal and the failure signal, for activating the electric pump means when both the ready and failure signals are received;

said pedal detector means and voltage supply means being coupled by an auxiliary fuse or circuit breaker to the battery for electrical power;

whereby the pedal detector means can generate a brake-on signal that can be provided as a ready siganl by the ready gate means, and the voltage supply means can activate the electrical pump means in response to said ready and pump failure signals even when the main fuse or circuit breaker blows.

10. A failure warning circuit for use with a vehicle braking system having a light switch for switching on and off a lamp signal to a vehicle stop light and a brake switch for switching on and off a ready signal to an auxiliary brake pump unit, the stop light switch and brake switch being adapted for substantially simultaneous activation to both switch on and off together, said warning circuit comprising:

comparator means coupled to the light switch and the brake switch for comparing the lamp and ready signals and generating a digitalized difference signal if one is off while the other is on;

low pass filter means responsive to the digitalized difference signal for smoothing it to produce an anomaly signal; and alarm means responsive to the anomaly signal for generating an alarm.

* * * * *